US012428903B2

(12) United States Patent
Bergs et al.

(10) Patent No.: US 12,428,903 B2
(45) Date of Patent: Sep. 30, 2025

(54) SPACER FOR INSULATING GLAZING

(71) Applicant: SAINT-GOBAIN GLASS FRANCE, Courbevoie (FR)

(72) Inventors: Bianca Bergs, Gangelt (DE); Walter Schreiber, Aachen (DE); Christopher Marjan, Aachen (DE); Pierrick Florin, Rethondes (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 174 days.

(21) Appl. No.: 18/259,714

(22) PCT Filed: Jan. 24, 2022

(86) PCT No.: PCT/EP2022/051425
§ 371 (c)(1),
(2) Date: Jun. 28, 2023

(87) PCT Pub. No.: WO2022/161890
PCT Pub. Date: Aug. 4, 2022

(65) Prior Publication Data
US 2024/0052687 A1 Feb. 15, 2024

(30) Foreign Application Priority Data
Jan. 27, 2021 (EP) .................................... 21153796

(51) Int. Cl.
*E06B 3/663* (2006.01)

(52) U.S. Cl.
CPC ...... *E06B 3/66319* (2013.01); *E06B 3/66361* (2013.01); *E06B 2003/66385* (2013.01)

(58) Field of Classification Search
CPC ............. E06B 3/66319; E06B 3/66361; E06B 2003/66385
See application file for complete search history.

(56) References Cited

U.S. PATENT DOCUMENTS

2007/0261325 A1* 11/2007 Rosskamp ................ E06B 3/24 52/204.5
2009/0120035 A1* 5/2009 Trpkovski ............. E06B 3/6733 29/897.3

(Continued)

FOREIGN PATENT DOCUMENTS

DE 29 29 544 A1 1/1981
DE 198 07 454 A1 8/1999

(Continued)

OTHER PUBLICATIONS

International Search Report as issued in International Patent Application No. PCT/EP2022/051425, dated Apr. 28, 2022.

*Primary Examiner* — Travis M Figg
(74) *Attorney, Agent, or Firm* — Pillsbury Winthrop Shaw Pittman LLP

(57) ABSTRACT

A spacer for insulating glazings includes a polymeric main body including first and second pane contact surfaces, a glazing interior surface, an outer surface and a hollow chamber. The first and second pane contact surfaces run opposite one another and parallel to one another. The glazing interior surface and the outer surface are connected to one another via the first pane contact surface and the second pane contact surface. The hollow chamber is enclosed by the glazing interior surface, the outer surface, the first pane contact surface, and the second pane contact surface. The outer surface has a first angled section adjacent the first pane contact surface and a second angled section adjacent the second pane contact surface. Each of the first and second angled sections assume an angle α of 120° to 150° relative to the respective adjacent first pane contact surface and second pane contact surface.

21 Claims, 2 Drawing Sheets

(56) References Cited

U.S. PATENT DOCUMENTS

Figure 1:
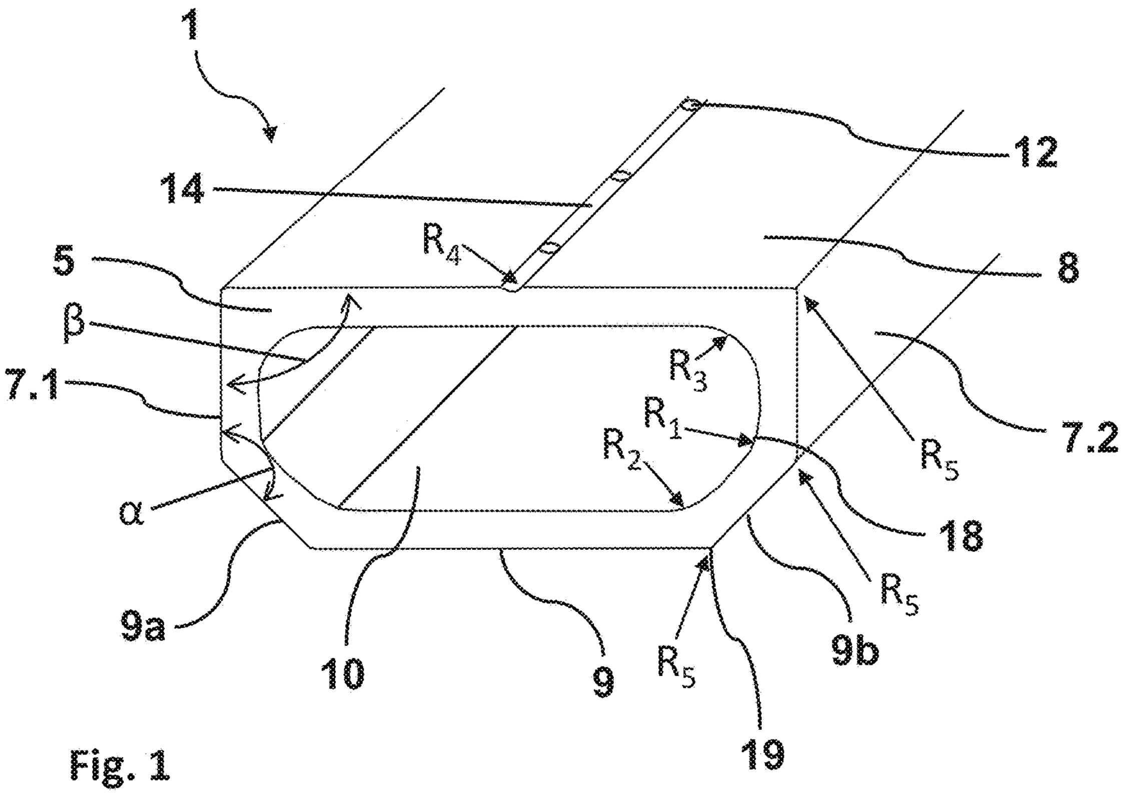

| | | | | |
|---|---|---|---|---|
| 2010/0034996 | A1* | 2/2010 | Mott | E06B 3/6612 52/204.6 |
| 2013/0316184 | A1* | 11/2013 | Siodla | E06B 3/66361 428/34 |
| 2014/0109499 | A1* | 4/2014 | Nieminen | E06B 7/16 52/204.593 |
| 2017/0298680 | A1* | 10/2017 | Schreiber | E06B 3/66314 |
| 2018/0058139 | A1* | 3/2018 | Schwerdt | E06B 3/66319 |
| 2018/0298674 | A1 | 10/2018 | Runze et al. | |
| 2018/0340365 | A1* | 11/2018 | Kuster | E06B 3/66319 |
| 2023/0184029 | A1* | 6/2023 | Bergs | B29C 48/793 52/786.13 |

FOREIGN PATENT DOCUMENTS

| | | | | |
|---|---|---|---|---|
| DE | 20 2019 106021 | U1 | 11/2019 | |
| EP | 2 930 296 | A1 | 10/2015 | |
| JP | S61-52017 | U | 4/1986 | |
| JP | S63-48732 | Y2 | 12/1988 | |
| JP | 2017-066768 | A | 4/2017 | |
| JP | 2019-507080 | A | 3/2019 | |
| JP | 2023-524781 | A | 6/2023 | |
| KR | 10-2017-0109616 | A | 9/2017 | |
| WO | WO 2013/104507 | A1 | 7/2013 | |
| WO | WO 2014/063801 | A1 | 5/2014 | |
| WO | WO 2014/198431 | A1 | 12/2014 | |
| WO | WO 2016/139180 | A1 | 9/2016 | |
| WO | WO 2017/174333 | A1 | 10/2017 | |
| WO | WO 2021/008951 | A1 | 1/2021 | |
| WO | WO-2021224042 | A1 * | 11/2021 | B29C 48/793 |

* cited by examiner

SPACER FOR INSULATING GLAZING

CROSS-REFERENCE TO RELATED APPLICATIONS

This application is the U.S. National Stage of PCT/EP2022/051425, filed Jan. 24, 2022, which in turn claims priority to European patent application number 21153796.4 filed Jan. 27, 2021. The content of these applications are incorporated herein by reference in their entireties.

The invention relates to a spacer for insulating glazings, an insulating glazing including such a spacer, and a method for production thereof.

Insulating glazings have become indispensable in building construction, especially in the wake of ever stricter environmental protection regulations. These are made of at least two panes that are joined to one another via at least one circumferential spacer. Depending on the embodiment, the space between the two panes, referred to as the glazing interior, is air- or gas-filled, but free, in any case, of moisture. Excessive moisture content in the glazing interpane space results, in particular with cold outside temperatures, in condensation of water droplets in the interpane space, which must absolutely be avoided. To absorb the residual moisture remaining in the system after assembly, desiccant-filled hollow-body spacers can be used.

DE 2929544 A1 discloses a metallic spacer for insulating glazings that has improved flexibility in the corner region of the insulating glazing.

In addition to sealing the interpane space against moisture, another crucial role of the spacer consists in thermal decoupling of the building interior on one side of the insulating glazing and the environment on the opposite side of the insulating glazing. The thermal conductivity of the spacer has a non-negligible influence on the thermal properties of the pane. In one of the known embodiments, spacers are made of a light metal, usually aluminum. These are easy to process; however, the insulating effect of the glazing in the edge region is significantly reduced due to the good thermal conductivity of aluminum (also referred to as the "cold edge" effect).

In order to improve the thermal properties, so-called "warm-edge" solutions for spacers are known. These spacers are made in particular of plastic and, consequently, have significantly reduced thermal conductivity. Compared to spacers made of metal, plastic spacers lack sufficient gas tightness, which, in turn, can be achieved by insulation films applied to the outer surface of the spacers.

WO 2013/104507 A1 discloses a spacer with a polymeric hollow profile main body and an insulation film. The insulation film contains a polymeric film and at least two metallic or ceramic layers, which are arranged alternatingly with at least one polymeric layer.

WO 2021/008951 A1 describes a hollow profile spacer with insulation film, wherein the insulation film includes at least one foamed polymer layer and at least one barrier layer.

WO 2017/174333 A1 discloses an insulating glazing unit for refrigeration equipment that comprises a first pane and a second pane joined to one another via a spacer frame. The spacer frame comprises a first hollow profile spacer with a proportion of 5% to 50% reinforcing fibers and a second hollow profile spacer with a proportion of 0% to 0.5% reinforcing fibers, wherein the second hollow profile spacers are preferably transparent.

In order to reduce the thermal conductivity of polymeric spacers even further, efforts are being made to implement spacers not only as hollow profiles but also to increase the air content within the material. For example, DE 19807454 A1 describes a foamed plastic spacer. Such foamed polymeric spacers can be produced, for example, by adding foaming agents, as shown in EP 2930296 A1. Also, WO 2016/139180 A1 discloses a foamed polymeric spacer containing voids created by the addition of a foaming agent.

However, the foaming of the spacer main body has a negative effect on the mechanical properties of the spacer, depending on the direction of the force acting on the spacer. Although foamed spacers often have good mechanical strength, they lack elasticity and have insufficient fracture behavior. Furthermore, there is also a need to improve the fracture strength of non-foamed polymeric spacers.

The object of the present invention is to provide a spacer that has low thermal conductivity and, at the same time, high fracture strength, an insulating glazing with this spacer, and a method for producing the spacer.

The object of the present invention is accomplished, according to the invention, by a spacer and an insulating glazing with a spacer according to the independent claims 1 and 15. Preferred embodiments of the invention emerge from the dependent claims.

The spacer according to the invention for insulating glazings comprises at least a polymeric main body comprising two pane contact surfaces, a glazing interior surface, an outer surface, and a hollow chamber. The two pane contact surfaces of the spacer are referred to as the first pane contact surface and the second pane contact surface. The first pane contact surface and the second pane contact surface are the sides of the spacer, on which, during installation of the spacer, the outer panes (first pane and second pane) of an insulating glazing are mounted. The first pane contact surface and the second pane contact surface are positioned opposite one another and run parallel to one another. The glazing interior surface and the outer surface are connected to one another via the first pane contact surface and the second pane contact surface. The space enclosed by the pane contact surfaces, the outer surface, and the glazing interior surface is the hollow chamber of the spacer. The glazing interior surface and the outer surface run parallel to one another at least in some sections. The outer surface of the spacer is in each case angled adjacent the pane contact surfaces, as a result of which increased stability of the main body is achieved. The outer surface has a first angled section adjacent the first pane contact surface and a second angled section adjacent the second pane contact surface. The first angled section assumes an angle $\alpha$ of 120° to 150° relative to the adjacent first pane contact surface, while the second angled section assumes an angle $\alpha$ of 120° to 150° to the adjacent second pane contact surface. The outer surface extending between the two angled sections of the outer surface, which runs parallel to the glazing interior surface, is arranged at an angle $\beta$ of 87° to 93° relative to the first pane contact surface and to the second pane contact surface. Here, the pane contact surfaces run parallel to one another. Accordingly, the pane contact surfaces either both assume an angle $\beta$ of 90° relative to the glazing interior surface or both deviate from 90° by the same amount with the opposite sign. In such a case, for example, one pane contact surface assumes an angle of 89.5° and the other pane contact surface assumes an angle of 90.5° relative to the glazing interior surface. The pane contact surfaces form corners with the glazing interior surface and with the angled sections of the outer surfaces, at which the pane contact surfaces abut the glazing interior surface or the angled sections of the outer surface. Similarly, there are also corners between the angled sections of the outer surface and the remaining outer surface positioned therebetween. At the corners, there is, in each case, a radius in which the corners are rounded. A distinction must be made between the corners situated within the hollow chamber, referred to as "inside the hollow chamber" and the outside corners facing away from the hollow chamber. According to the invention, at least one of the corners inside the hollow chamber, which are formed between an angled section of the outer surface and the respective adjacent pane contact surface, is rounded with a radius $R_1$ of 0.4 mm to 2.5 mm. Furthermore, at least one of the corners inside the hollow chamber, which are formed between the first angled section and the outer surface as well as between the second angled section and the outer surface, is rounded with a radius $R_2$ of 0.4 mm to 2.5 mm. Of the corners inside the hollow chamber, which are formed between the glazing interior surface and the first pane contact surface as well as between the glazing interior surface and the second pane contact surface, at least one corner is rounded with a radius $R_3$ of 1.0 mm to 2.5 mm.

The main body of the spacer has a hollow chamber that extends along the main body, i.e., is designed as a hollow profile spacer. On the inside of the hollow profile spacer, i.e., on the inner surface of the spacer delimiting the hollow chamber, the corners of the main body wall are referred to as corners inside the hollow chamber. Thus, in all regions of the wall in which the slope of the spacer wall changes, the adjacent sections of the main body wall abut in the form of a corner. The inside corners are referred to as corners inside the hollow chamber; and the outside corners pointing toward the external surroundings, as outer corners. At least one corner of the main body inside the hollow chamber, which is positioned in the region of an angled section and the pane contact surface adjacent thereto, is rounded according to the invention with a radius $R_1$ of 0.4 mm to 2.5 mm. Preferably, both corners inside the hollow chamber between an angled section and an adjacent pane contact surface are rounded with this radius. Further, according to the invention, at least one of the corners inside the hollow chamber between the outer surface and the adjacent angled sections is also rounded with a radius $R_2$ of 0.4 mm to 2.5 mm. Preferably, both corners inside the hollow chamber between the outer surface and the angled sections are provided with rounding of this radius. In the region of the glazing interior surface and the adjacent pane contact surfaces there are also corners inside the hollow chamber, which are rounded at least partially according to the invention with a radius $R_3$ of 1.0 mm to 2.5 mm. Preferably, all corners inside the hollow chamber in the region between glazing interior surface and adjacent pane contact surfaces are correspondingly rounded.

The spacer according to the invention with rounded corners inside the hollow chamber has significantly higher mechanical stability and improved fracture properties compared to known spacers. In addition, the geometry of the spacer is particularly well-suited in connection with foamed base body materials. Even with non-foamed polymeric spacers, an improvement in stability can be achieved. Furthermore, by increasing the radii $R_3$, $R_2$, and/or $R_1$, the material thickness in the region of the corners is increased, ensuring improved weldability of the spacer.

Tests by the inventors have shown that the radius $R_3$ has the greatest influence on the mechanical properties of the spacer. A significant improvement of the mechanical properties of the spacer is can already be observed when the radius $R_3$ is selected between 1.0 mm and 2.5 mm. This is also true when the radii $R_1$ and $R_2$ are selected independently of $R_3$ within the substantially larger range from 0.4 mm to 2.5 mm and can also assume comparatively small radii. The adjustment of the radii $R_1$ and $R_2$ results in an equalization of the mass balance on the glazing interior side and the outside of the spacer. As a result, the spacer cools down uniformly at the top and the bottom in the production process after extrusion, thus avoiding differential shrinkage and counteracting differential warping that results in curvature of the spacer profile. However, the effect described can also be counteracted in other ways such that the radii $R_1$ and $R_2$ do not necessarily have to be changed to the same extent as the radius $R_3$.

The glazing interior surface is defined as the surface of the spacer main body that faces in the direction of the interior of the glazing after installation of the spacer in an insulating glazing. The glazing interior surface is located between the first and the second pane.

The outer surface of the spacer main body is the side opposite the glazing interior surface that faces away from the interior of the insulating glazing in the direction of an outer seal. The glazing interior surface and the outer surface preferably run substantially parallel to one another, with the exception of the angled sections.

The first pane contact surface and the second pane contact surface are the surfaces of the spacer used for mounting the panes of an insulating glazing. The first pane contact surface and the second pane contact surface are substantially parallel to one another.

The hollow chamber of the main body is adjacent the glazing interior surface, with the glazing interior surface situated above the hollow chamber and the outer surface of the spacer situated below the hollow chamber. In this context, "above" is defined as facing the inner interpane space of the insulating glazing in the installed state of the spacer and "below" as facing away from the pane interior.

The hollow chamber of the spacer results in a weight reduction in comparison with a solidly formed spacer and is available to accommodate additional components, for instance, a desiccant.

In a preferred embodiment of the invention, the first angled section and the second angled section have in each case an angle α of 130° to 140° relative to the respective adjacent pane contact surface. This is advantageous for the further improvement of the mechanical stability of the spacer. Preferably, the angle α between the first angled section and the pane contact surface assumes the same value as the angle α between the second angled section and the pane contact surface. Such a symmetrical design results in further stability advantages.

Preferably, each corner inside the hollow chamber, which is formed between an angled section and the adjacent pane contact surface, is rounded with a radius $R_1$ of 0.4 mm to 2.5 mm. Particularly preferably, each of these corners is rounded with a radius of 0.6 mm to 2.5 mm, in particular 0.8 mm to 2.5 mm, for example, 1.5 mm to 2.5 mm, thus achieving further improved results.

In an advantageous embodiment, the corners inside the hollow chamber, which are formed between a first angled section and the outer surface as well as a second angled section and the outer surface, are rounded in each case with a radius $R_2$ of 0.4 mm to 2.5 mm. Preferably selected is a radius $R_2$ of 0.6 mm to 2.5 mm, particularly preferably 0.8 mm to 2.5 mm, in particular 1.5 mm to 2.5 mm. This increases the strength in the corners of the spacer and more uniform cooling behavior is achieved by corresponding adjustment of the radii. The difference between the stresses in the upper and lower region of the spacer can be further reduced in this manner.

The glazing interior surface preferably assumes in each case an angle β of 89.5° to 90.5° with the first pane contact surface and the second pane contact surface. In particular, the angle β is exactly 90°, within the context of usual production fluctuations. The corners inside the hollow chamber in the region of the glazing interior surface and the first pane contact surface and in the region of the glazing interior surface and the second pane contact surface are preferably in each case rounded with a radius $R_3$ of 1.0 mm to 2.0 mm, preferably 1.3 mm to 1.7 mm. A particularly advantageous minimization of stresses occurs in these ranges.

The outside corners of the spacer can optionally also be rounded. Although the influence of this on the mechanical stability of the spacer is less in comparison with the design of the corners inside the hollow chamber, an improvement can nevertheless be achieved by this measure. In addition, the rounded outside corners contribute to simplified production of the spacer in a mold. The outside corners in the regions between the angled sections and the outer surface and between the angled sections and the respective adjacent pane contact surfaces are preferably rounded with a radius $R_5$ of 0.125 mm to 0.7 mm, preferably 0.3 mm to 0.7 mm.

It was found that a further influence on the mechanical properties of the spacer resides in the height of the pane contact surfaces. In a preferred embodiment, the height of the pane contact surfaces is between 55% and 80%, preferably between 60% and 75%, of the overall height of the spacer. Compared to known prior art spacers, this comparatively high proportion of the overall height is advantageous in terms of stability as well as secure bonding of the panes of an insulating glazing to the pane contact surfaces. Moreover, the height of the spacer within which there is an angled shape is thereby reduced. Consequently, the volume of the hollow chamber of the spacer is enlarged such that comparatively more spacer volume is available to accommodate desiccant.

The height of the spacer is determined as the maximum height of the spacer between the glazing interior surface and the outer surface. The height of the spacer is preferably 5.0 mm to 10.0 mm, particularly preferably 6.0 mm to 8.0 mm, in particular 6.5 mm to 7.0 mm. Within these ranges, good stability of the spacer and secure bonding of the panes to the pane contact surfaces are achieved.

The width of the spacer is defined as the maximum extent of the spacer between the opposing pane contact surfaces. The width of the spacer depends essentially on the desired interpane spaces of the insulating glazing to be produced. The width of the spacer is typically 4 mm to 30 mm, preferably 8 mm to 16 mm.

Preferably, the wall thickness of the main body is between 0.5 mm and 1.5 mm, particularly preferably between 0.8 mm and 1.2 mm. In these ranges, good stability is achieved. At the same time, material consumption is kept as low as possible.

A perforation groove running substantially parallel to the pane contact surfaces is preferably introduced into the glazing interior surface. The perforation groove is a depression in the glazing interior surface. i.e., the perforation groove is offset from the glazing interior surface toward the hollow chamber by the depth of the perforation groove. The perforation groove preferably has a depth of 0.05 mm to 0.5 mm, particularly preferably 0.07 mm to 0.25 mm, for example, 0.10 mm. The perforation groove is preferably rounded with a radius $R_4$ of 0.20 mm to 0.50 mm, particularly preferably 0.30 mm to 0.40 mm, for example, 0.36 mm. Such a flat and rounded geometry of the perforation groove advantageously results in minimized mechanical stresses in the region of the perforation groove.

Within the perforation groove, a plurality of openings are made in the glazing interior surface, with there being, in the region of the openings, a direct passage between the hollow chamber and the region above the glazing interior surface. In the installed state of the spacer in an insulating glazing, the openings connect the interior of the hollow chamber to the glazing interior, making possible a gas exchange between them. This allows absorption of atmospheric humidity by a desiccant situated in the hollow chambers and thus prevents fogging of the panes. The openings are preferably implemented as slits, particularly preferably as slits with a width of 0.1 mm to 0.3 mm, for example, 0.2 mm, and a length of 1.5 mm to 3.5 mm, for example, 2 mm. The slits ensure optimum air exchange without desiccant being able to penetrate out of the hollow chamber into the inner interpane space. The total number of openings depends on the size of the insulating glazing.

The polymeric main body preferably contains polyethylene (PE), polycarbonates (PC), polypropylene (PP), polystyrene, polybutadiene, polynitriles, polyesters, polyurethanes, polymethyl methacrylates, polyacrylates, polyamides, polyethylene terephthalate (PET), polybutylene terephthalate (PBT), preferably acrylonitrile butadiene styrene (ABS), acrylonitrile styrene acrylester (ASA), acrylonitrile butadiene styrene/polycarbonate (ABS/PC), styrene acrylonitrile (SAN), PET/PC, PBT/PC, and/or copolymers or mixtures thereof. Good results in terms of mechanical stability are achieved with these materials.

In a particularly preferred embodiment of the spacer, the main body includes a thermoplastic polymer. Suitable thermoplastic polymers considered for the main body include, for example, polyethylene (PE), polystyrene, polyethylene terephthalate (PET), polypropylene (PP), styrene acrylonitrile (SAN), or copolymers or mixtures thereof. The use of styrene-based thermoplastic polymers as base material has proved to be particularly advantageous in terms of the mechanical properties of the main body. A particularly suitable thermoplastic polymer is styrene acrylonitrile (SAN).

The polymeric main body is preferably a foamed main body that has a pore structure. A pore structure is a structure with regular hollow spaces that are filled with air.

Various processes are known for the foaming of plastic melts, such as the polymer melt for the extrusion of the polymeric main body, which can be categorized as physical, mechanical, and chemical processes. In physical and mechanical processes, a gas is incorporated into the polymer melt solely by physical or mechanical methods. In contrast, chemical foaming processes are based on the decomposition of a blowing agent as a result of the supplying of heat, causing a volatile gaseous component of the blowing agent to split off. The finely dispersed gaseous component created in the melt causes the foaming of the polymer melt. Direct foaming processes are preferably used for producing the spacer according to the invention. The direct foaming processes include foam extrusion, which is preferably used for producing the spacer according to the invention and in which the gas released by the blowing agent causes expansion of the plastic as it emerges from a nozzle. As a result of foaming during extrusion, the walls of the hollow profile are no longer formed as a solid material, but are, instead, penetrated by gas bubbles, hence pore-shaped voids. The foamed implementation of the main body is advantageous in terms of the thermal properties of the main body and, at the same time, results in a weight reduction. With regard to the weight reduction, approx. 10% to 20% of the weight is saved compared to a main body implemented as a solid material. The thermal properties are greatly improved by the gases enclosed in the voids, with the gases resting in the pores acting as a thermal insulator.

Preferably, the polymeric main body is foamed by chemical foaming with the addition of a foaming agent. The foaming agent is preferably used in the form of a granulate comprising a carrier material and a blowing agent. When heat is supplied, the blowing agent decomposes in an endothermic reaction with the splitting out of a gaseous substance, preferably $CO_2$. Foaming agents for the chemical foaming of plastics are known to the person skilled in the art and are available commercially. The carrier material is usually a polymer granulate, for example, based on polypropylene, ethylene vinyl acetate (EVA), ethylene butyl acrylate copolymer (EBA), polyethylene (PE), thermoplastic polystyrene (TPS), or thermoplastic polyurethanes (TPU). The granular foaming agent is generally added to the polymer mixture prior to the melting in the extruder.

The foaming agent is preferably added to the polymer mixture of the polymeric main body in an amount of 0.5 wt.-% to 3.0 wt.-%, particularly preferably 0.5 wt.-% to 2.0 wt.-%, in particular 0.8 wt.-% to 1.2 wt.-%. These small amounts are sufficient to obtain the desired porosity of the main body.

The polymeric main body preferably comprises closed-cell pores. The pore size is preferably 10 μm to 100 μm, particularly preferably from 20 μm to 80 μm, in particular from 30 μm to 70 μm. Within these pore sizes, both an advantageous reduction in thermal conductivity and good mechanical stability of the main body can be achieved.

The foamed polymeric main body is preferably manufactured from a thermoplastic polymer as base material, with in particular polyethylene (PE), polystyrene, polyethylene terephthalate (PET), polypropylene (PP), styrene acrylonitrile (SAN), or copolymers or mixtures thereof being advantageous.

The proportions of the individual components of the mixture of the polymeric main body, indicated in percent by weight, add up to 100%, with components other than those just mentioned possibly also present. Examples of such other components are elastomeric additives, reinforcing agents, and color pigments.

In a preferred embodiment, the main body is manufactured from a thermoplastic polymer as base material, to which a reinforcing agent is added and/or with which an elastomeric additive is admixed.

The proportion of the thermoplastic polymer as base material of the polymeric main body is between 30.0 wt.-% and 70.0 wt.-%, and the proportion of the reinforcing agent is 20.0 wt.-% to 45.0 wt.-%. Furthermore, the polymeric main body optionally includes an elastomeric additive, causing an improvement of the elastic properties of the spacer. A thermoplastic elastomer and/or a thermoplastic terpolymer having an elastomeric component is added as the elastomeric additive. The elastomeric additive has a proportion of 0.5 wt.-% to 20.0 wt.-% in total of the total mass of the main body. Within this order of magnitude, a substantial improvement of the elastic properties of the main body can be observed. As a result, the mechanical properties of the spacer are improved. A main body with geometry according to the invention with rounded corners inside the hollow chamber in combination with a foamed thermoplastic polymer as the main body material, at least one reinforcing agent and at least one elastomeric additive has proved particularly advantageous for the mechanical properties of the spacer.

Preferably, a thermoplastic elastomer or a thermoplastic terpolymer having an elastomeric component is mixed into the main body as an elastomeric additive. Thermoplastic elastomers as an elastomeric additive are preferably added at a proportion of 0.3 wt.-% to 5.0 wt.-%, preferably 0.3 wt.-% to 4.0 wt.-%, while thermoplastic terpolymers having an elastomeric component are used at a proportion of 3.0 wt.-% to 20.0 wt.-%, preferably 4.0 wt.-% to 14.0 wt.-%.

In a preferred embodiment of the spacer according to the invention, a thermoplastic elastomer from the group of thermoplastic polyurethanes (TPU) and/or the group of thermoplastic styrene block copolymers (TPS) is used as an elastomeric additive. In the case of the thermoplastic elastomers TPU and TPS, a proportion of 0.3 wt.-% to 5.0 wt.-% already suffices to bring about the desired improvement in the elastic properties. Particularly preferably, 0.5 wt.-% to 4.0 wt.-%, in particular 1.5 wt.-% to 2.5 wt.-% TPU and/or TPS is added. These small amounts already suffice to achieve sufficient elasticity, wherein in the preferred ranges, better visual appearance of the surface and better stability of the polymer melt during the production of the main body are achieved.

In another preferred embodiment of the spacer according to the invention, the elastomeric additive is a thermoplastic terpolymer having an elastomeric component. The thermoplastic terpolymer is a copolymer of multiple monomeric components, wherein at least one monomeric component provides the elastic properties of the elastomeric additive. The other monomeric components can, for example, be selected such that good compatibility with the base material of the spacer is ensured.

The thermoplastic terpolymers having an elastomeric component are preferably added at a proportion of 3.0 wt.-% to 20.0 wt.-%, preferably 4.0 wt.-% to 20.0 wt.-%, particularly preferably 4.0 wt.-% to 14.0 wt.-%. These ranges have proved to be particularly advantageous in terms of the resulting elasticity of the main body. In particular, as elastomeric additives, ABS and/or ASA are advantageous in this respect.

The thermoplastic terpolymer is preferably realized as acrylonitrile-butadiene-styrene copolymer (ABS), the elastomeric component of which consists in the butadiene portion of the copolymer. As an elastomeric additive to the main body, ABS brings about higher impact strength and elasticity of the material.

ABS has proved to be particularly effective in terms of mechanical properties and elasticity when used at a rate of 4.0 wt.-% to 20.0 wt.-%, particularly preferably 4.5 wt.-% to 13.0 wt.-%, in particular 6.0 wt.-% to 12.0 wt.-% ABS in the main body.

Another preferred embodiment of the invention includes a spacer with a thermoplastic terpolymer having an elastomeric component, with acrylonitrile-styrene-acrylate (ASA) used as the thermoplastic terpolymer. Acrylonitrile-styrene-acrylate refers to a styrene-acrylonitrile copolymer modified with acrylate rubber, wherein, in the context of the invention, the elastomeric component is acrylate rubber. The properties of ASA are basically similar to those of ABS, with similar proportions having proved particularly advantageous. ASA is preferably added at a proportion of 4.0 wt.-% to 20 wt.-%, particularly preferably 4.5 wt.-% to 13.0 wt.-%, in particular 6.0 wt.-% to 12.0 wt.-%.

In a particularly preferred embodiment of the spacer, a styrene-based thermoplastic polymer is selected for the base material, with the elastomeric additive containing at least no polypropylene, preferably no olefin-based thermoplastic elastomers (TPO). It has been found that mixtures of styrene-based thermoplastic polymers with propylene as an elastomeric additive have stability problems of the melt in the extrusion process. Similar effects are to be expected with other olefin-based thermoplastic elastomers such that this group should preferably be completely avoided when selecting the elastomeric additive.

A wide variety of reinforcing agents in the form of fibers, powders, or platelets are known to the person skilled in the art as reinforcing agents in polymeric main bodies. Powder and/or platelet reinforcing agents include, for example, mica and talc. Particularly preferred, in terms of mechanical properties, are reinforcing fibers, which include glass fibers, aramid fibers, carbon fibers, ceramic fibers, or natural fibers. Alternatives to these are also ground glass fibers or hollow glass spheres. These hollow glass spheres have a diameter of 10 μm to 20 μm and improve the stability of the polymeric hollow profile. Suitable hollow glass spheres are commercially available under the name "3M™ Glass Bubbles". In one possible embodiment, the polymeric main body contains both glass fibers and hollow glass spheres. An admixture of hollow glass spheres results in further improvement of the thermal properties of the hollow profile.

Particularly preferably, glass fibers are used as reinforcing agents, with these being added at a proportion of 25 wt.-% to 40 wt.-%, in particular at a proportion of 30 wt.-% to 35 wt.-%. Within these ranges, good mechanical stability and strength of the main body can be observed. Furthermore, a glass fiber content of 30 wt.-% to 35 wt.-% Is quite compatible with the multilayer barrier film composed of alternating polymeric and metallic layers applied to the outer surface of the spacer in a preferred embodiment. By adjusting the coefficient of thermal expansion of the polymeric main body and the barrier film or barrier coating, temperature-induced stresses between the different materials and flaking of the barrier film or the barrier coating can be avoided.

The main body preferably includes a gas- and vapor-tight barrier film, which serves to improve the gas tightness of the main body. Preferably, this is applied at least on the outer surface of the polymeric main body, preferably on the outer surface and on a part of the pane contact surfaces. The gas- and vapor-tight barrier improves the tightness of the spacer against gas loss and moisture penetration. Preferably, the barrier is applied on approx. one-half to two-thirds of the pane contact surfaces, but can also be attached along relatively large regions or the entire height of the pane contact surfaces. A suitable barrier film is disclosed, for example, in WO 2013/104507 A1.

In a preferred embodiment, the gas- and vapor-tight barrier on the outer surface of a polymeric spacer is implemented as a film. This barrier film contains at least one polymeric layer as well as a metallic layer or a ceramic layer. The layer thickness of the polymeric layer is between 5 μm and 80 μm, whereas metallic layers and/or ceramic layers with a thickness of 10 nm to 200 nm are used. Within the layer thicknesses mentioned, particularly good tightness of the barrier film is achieved. The barrier film can be applied on the polymeric main body, for example, by gluing. Alternatively, the film can be coextruded together with the main body.

The barrier film particularly preferably contains at least two metallic layers and/or ceramic layers arranged alternatingly with at least one polymeric layer. The layer thicknesses of the individual layers are preferably as described in the preceding paragraph. Preferably, the outer layers are formed by a metallic layer. The alternating layers of the barrier film can be bonded or applied on one another by a large variety of known prior art methods. Methods for depositing metallic or ceramic layers are well known to the person skilled in the art. The use of a barrier film with an alternating layer sequence is particularly advantageous in terms of the tightness of the system. A defect in one of the layers does not result in functional loss of the barrier film. In comparison, even a small defect in a single layer can result in a complete failure. Furthermore, the application of multiple thin layers is advantageous in comparison with one thick layer, since the risk of internal adhesion problems increases with increasing layer thickness. Also, thicker layers have higher conductivity such that such a film is less suitable thermodynamically.

The polymeric layer of the film preferably includes polyethylene terephthalate, ethylene vinyl alcohol, polyvinylidene chloride, polyamides, polyethylene, polypropylene, silicones, acrylonitriles, polyacrylates, polymethyl acrylates, and/or copolymers or mixtures thereof. The metallic layer preferably contains iron, aluminum, silver, copper, gold, chromium, and/or alloys or oxides thereof. The ceramic layer of the film preferably contains silicon oxides and/or silicon nitrides.

In an alternative preferred embodiment, the gas- and vapor-tight barrier is preferably implemented as a coating. The coating contains aluminum, aluminum oxides, and/or silicon oxides and is preferably applied by a PVD method (physical vapor deposition). Coating with the materials mentioned provides particularly good results in terms of tightness and, additionally, exhibits excellent properties of adhesion to the materials of the outer seal used in insulating glazings.

In a particularly preferred embodiment, the gas- and vapor-tight barrier has at least one metallic layer or ceramic layer that is implemented as a coating and contains aluminum, aluminum oxides, and/or silicon oxides and is preferably applied by a PVD method (physical vapor deposition).

The spacer described including a first pane contact surface and a second pane contact surface is suitable both for double and triple and multiple glazings. To accommodate multiple panes, it is possible to use either additional spacers or a spacer main body suitable in its shape to accommodate multiple panes. In the first case, a first and a second pane are first attached to the pane contact surfaces of the spacer and, then, further spacers are attached to one of the surfaces of the panes facing away from the spacer, whose exposed pane contact surfaces accommodate further panes. In the embodiment alternative thereto, a triple or multiple insulating glazing can also be implemented with a spacer in the form of a double spacer. Such a double spacer can accommodate at least one additional pane in a groove. For example, a spacer for triple glazings has a groove in the glazing interior surface between the first pane contact surface and the second pane contact surface, into which a third pane is inserted between the first pane and the second pane. The first and the second pane are attached to the first and second pane contact surface of the spacer. Since the groove extends between the first glazing interior surface and the second glazing interior surface, it delimits them laterally and separates a first hollow chamber and a second hollow chamber from one another. The lateral flanks of the groove are formed by the walls of the first hollow chamber and the second hollow chamber. Such basic spacer forms are known from, among others, WO 2014/198431 A1.

The invention further includes an insulating glazing with a spacer according to the invention. The insulating glazing includes at least a first pane, a second pane, and a circumferential spacer according to the invention surrounding the panes.

The glazing interior of the insulating glazing is situated adjacent the glazing interior surface of the spacer. On the other hand, the outer surface of the spacer is adjacent the outer interpane space. The first pane is attached to the first pane contact surface of the spacer; and the second pane, to the second pane contact surface of the spacer.

The first and the second pane are attached to the pane contact surfaces preferably via a sealant that is applied between the first pane contact surface and the first pane and/or the second pane contact surface and the second pane.

The sealant preferably contains butyl rubber, polyisobutylene, polyethylene vinyl alcohol, ethylene vinyl acetate, polyolefin rubber, polypropylene, polyethylene, copolymers, and/or mixtures thereof.

The sealant is preferably introduced with a thickness of 0.1 mm to 0.8 mm, particularly preferably 0.2 mm to 0.4 mm into the gap between the spacer and the panes.

The outer interpane space of the insulating glazing is preferably filled with an outer seal. This outer seal serves primarily for bonding the two panes and thus for mechanical stability of the insulating glazing.

The outer seal preferably contains polysulfides, silicones, silicone rubber, polyurethanes, polyacrylates, copolymers, and/or mixtures thereof. Such materials have very good adhesion to glass such that the outer seal ensures secure bonding of the panes. The thickness of the outer seal is preferably 2 mm to 30 mm, particularly preferably 5 mm to 10 mm.

In a particularly preferred embodiment of the invention, the insulating glazing includes at least three panes, with a further spacer frame attached to the first pane and/or the second pane, to which frame the at least third pane is attached. In an alternative embodiment, the insulating glazing includes a double spacer with a groove, into whose groove the third pane is inserted. The first and the second pane rest against the pane contact surfaces.

The first pane, the second pane, and/or the third pane of the insulating glazing preferably contain glass, particularly preferably quartz glass, borosilicate glass, soda lime glass, and/or mixtures thereof. The first and/or second pane of the insulating glazing can also include thermoplastic polymeric panes. Thermoplastic polymeric panes preferably include polycarbonate, polymethyl methacrylate, and/or copolymers and/or mixtures thereof. Additional panes of the insulating glazing can have the same composition as mentioned for the first, second, and third pane.

The first pane and the second pane have a thickness of 2 mm to 50 mm, preferably 2 mm to 10 mm, particularly preferably 4 mm to 6 mm, with the two panes possibly even having different thicknesses.

The first pane, the second pane, and other panes can be made of single-pane safety glass, thermally or chemically toughened glass, float glass, extra-clear low-iron float glass, colored glass, or laminated safety glass including one or more of these components. The panes can have any other components or coatings, for example, low-E layers or other sun shading coatings.

The outer interpane space, delimited by the first pane, the second pane, and the outer surface of the spacer, is filled at least partially, preferably completely, with an outer seal. Very good mechanical stabilization of the edge seal is thus achieved.

Preferably, the outer seal contains polymers or silane-modified polymers, particularly preferably organic polysulfides, silicones, room-temperature-vulcanizing (RTV) silicone rubber, peroxide-vulcanizing silicone rubber, and/or addition-vulcanizing silicone rubber, polyurethanes, and/or butyl rubber.

The sealant between the first pane contact surface and the first pane, or between the second pane contact surface and the second pane, preferably contains a polyisobutylene. The polyisobutylene can be a cross-linking or non-cross-linking polyisobutylene.

The insulating glazing is optionally filled with a protective gas, preferably with a noble gas, preferably argon or krypton, which reduce the heat transfer value in the insulating glazing interpane space.

In principle, a wide variety of geometries of the insulating glazing are possible, for example, rectangular, trapezoidal, and rounded shapes. For producing round geometries, the spacer can, for example, be bent in the heated state.

At the corners of the insulating glazing, the spacers are linked to one another, for example, via corner connectors. Such corner connectors can be implemented, for example, as molded plastic parts with a seal, in which two spacers abut.

As an alternative to this, the spacers can also be joined directly to one another at the corners, for example, by welding the spacers adjacent each other in the corner region. For example, the spacers are mitered at 45° and joined to one another by ultrasonic welding.

In another preferred embodiment, the spacer is not separated at the corners of the glazing and connected at the required angle by corner connectors, but, instead, is bent into the corresponding corner geometry while heated.

A preferred method for producing a spacer according to the invention comprises the steps:

a) Providing a polymer mixture for producing a main body, preferably at least comprising a thermoplastic polymer as base material, optionally also including at least one elastomeric additive, one reinforcing agent, and/or one foaming agent,
b) Melting the mixture in an extruder at a temperature of 200° C. to 240° C.,
c) optionally: Decomposing the foaming agent under the effect of temperature,
d) Discharge of the melt from the extruder through a mold and forming a spacer main body,
e) Stabilizing the spacer, and
f) Cooling the spacer.

The polymeric components of the mixture in step a) are preferably provided in the form of granules. This is true in particular for a thermoplastic polymer as base material and an elastomeric additive. As a result, these can be readily metered and easy to handle. The reinforcing agent is in fiber or spherical form, i.e., is also easy to meter. The reinforcing agent can also be provided together with the thermoplastic polymer. Such mixtures of thermoplastic polymers with a defined reinforcing agent content are commercially available. Suitable foaming agents in the form of a granulate comprising a carrier material and a blowing agent can be purchased commercially. The blowing agent is applied to the surface of the granular carrier material. The concentration of the blowing agent on the carrier material can vary and is often between 15 wt.-% and 30 wt.-%, for example, 20 wt.-% or 25 wt.-%. If a foaming agent is used, foaming of the melt occurs in step c) during discharge of the melt through the mold, resulting in the formation of pores in the spacer.

Preferably, the mixture provided in step a) includes color pigments and/or additives, particularly preferably, at least color pigments. The color pigments are provided in the form of a polymer-bound color pigment in which the color pigment is compressed with the thermoplastic base material used in the form of granules. These granules, also referred to colloquially as a "color masterbatch" improve the meterability of the color pigments and increase the technical process reliability. A polymer-bound color pigment is optionally added to the mixture in step a) at a proportion of 1.0 wt.-% to 4.0 wt.-%, depending on the coloration desired.

In a preferred embodiment of the method, in step a) styrene acrylonitrile is used as base material, while the elastomeric additive is a thermoplastic elastomer from the group of thermoplastic polyurethanes (TPU) and/or the group of thermoplastic styrene block copolymers (TPS) and is added at a proportion of 0.3 wt.-% to 5 wt.-%. Particularly preferably, the mixture is composed of thermoplastic polymer as base material at a proportion of 30 wt.-% to 70 wt.-%, elastomeric additive at a proportion of 0.3 wt.-% to 5 wt.-%, and glass fibers as a reinforcing agent at a proportion of 30 wt.-% to 40 wt.-%. The foaming agent is added at a proportion of 0.5 wt.-% to 2 wt.-%. During the melting in the extruder, this mixture exhibits good compatibility of the components with one another and good process stability.

In another embodiment of the method, in step a) styrene acrylonitrile is used as base material, wherein the elastomeric additive is acrylonitrile-butadiene-styrene copolymer (ABS) and/or acrylonitrile-styrene-acrylate (ASA) and is added at a proportion of 4.0 wt.-% to 20.0 wt.-%.

Preferably, a mixture of SAN as thermoplastic base material is used at a proportion of 30 wt.-% to 70 wt.-%, elastomeric additive at a proportion of 4.0 wt.-% to 20.0 wt.-%, and glass fibers as reinforcing agent at a proportion of 30 wt.-% to 40 wt.-%. The foaming agent is added at a proportion of 0.5 wt.-% to 2.0 wt.-%.

A preferred embodiment is a method, wherein the mixture is melted in an extruder at a temperature of 200° C. to 240° C. preferably 215° C. to 220° C. At these melting temperatures, very good results are obtained in terms of the pore structure of the foamed spacer.

Preferably, the melt is foamed using a foaming agent that decomposes endothermically under the effect of temperature, releasing $CO_2$.

To form the main body, the melt is preferably shaped into a hollow profile through a mold using a melt pump. The main body is stabilized based on the not yet solidified main body profile using a vacuum calibration tool. This ensures the geometry of the main body. The main body is then preferably passed through a cooling bath and cooled to approx. room temperature.

In a preferred embodiment, a gas- and vapor-tight barrier film is applied to the outside of the main body. Preferably, this is coextruded with or bonded to the main body, particularly preferably bonded.

The spacer produced by means of the method described can be used in a method for producing an insulating glazing. Such a method comprises at least the steps:

g) Providing spacers according to the invention, h) Assembling a spacer frame from spacers according to the invention, i) Attaching a first pane to the first pane contact surface of the spacer frame via a sealant, Attaching a second pane to the second pane contact surface of the spacer frame via a sealant.

j) optionally: Attaching at least one further spacer frame to the first pane and/or to the second pane and Attaching a third pane and, optionally, further panes to the further spacer frames, k) Pressing the pane assembly, l) Introducing an outer seal into the outer interpane space.

The bonding of the panes to the pane contact surfaces per step i) can be carried out in any order. Optionally, the bonding of the two panes to the pane contact surfaces can even be done simultaneously.

In step l), the outer interpane space is at least partially, preferably completely, filled with an outer seal. The outer seal is preferably extruded directly into the outer interpane space, for example, in the form of a plastic sealing compound.

Preferably, the glazing interior between the panes is filled with a protective gas before the pressing of the assembly (step k).

The regarding a method for producing the spacer according to the invention and a method for producing the insulating glazing according to the invention The invention is explained in detail in the following with reference to drawings. The drawings are purely schematic representations and not to scale. They in no way restrict the invention.

Figure 2A:
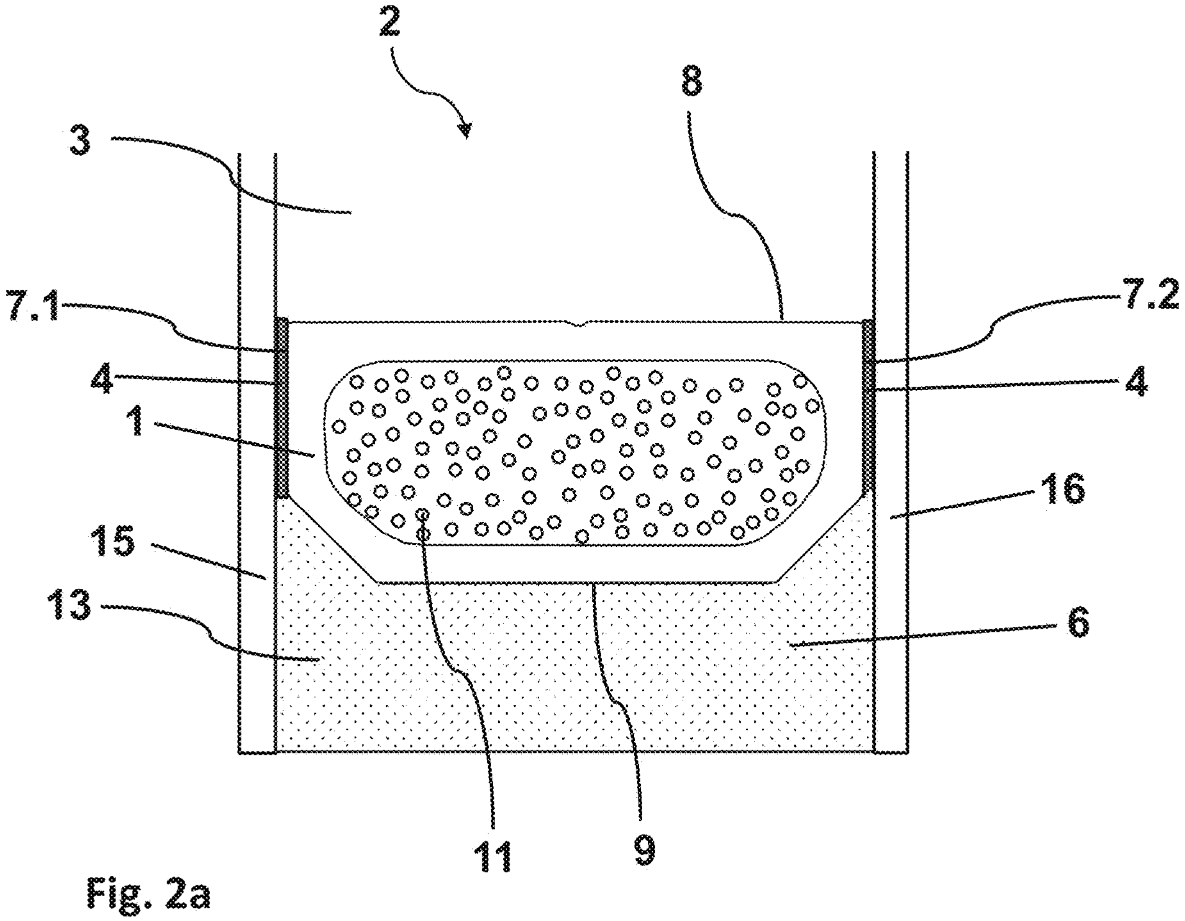
Figure 2B:
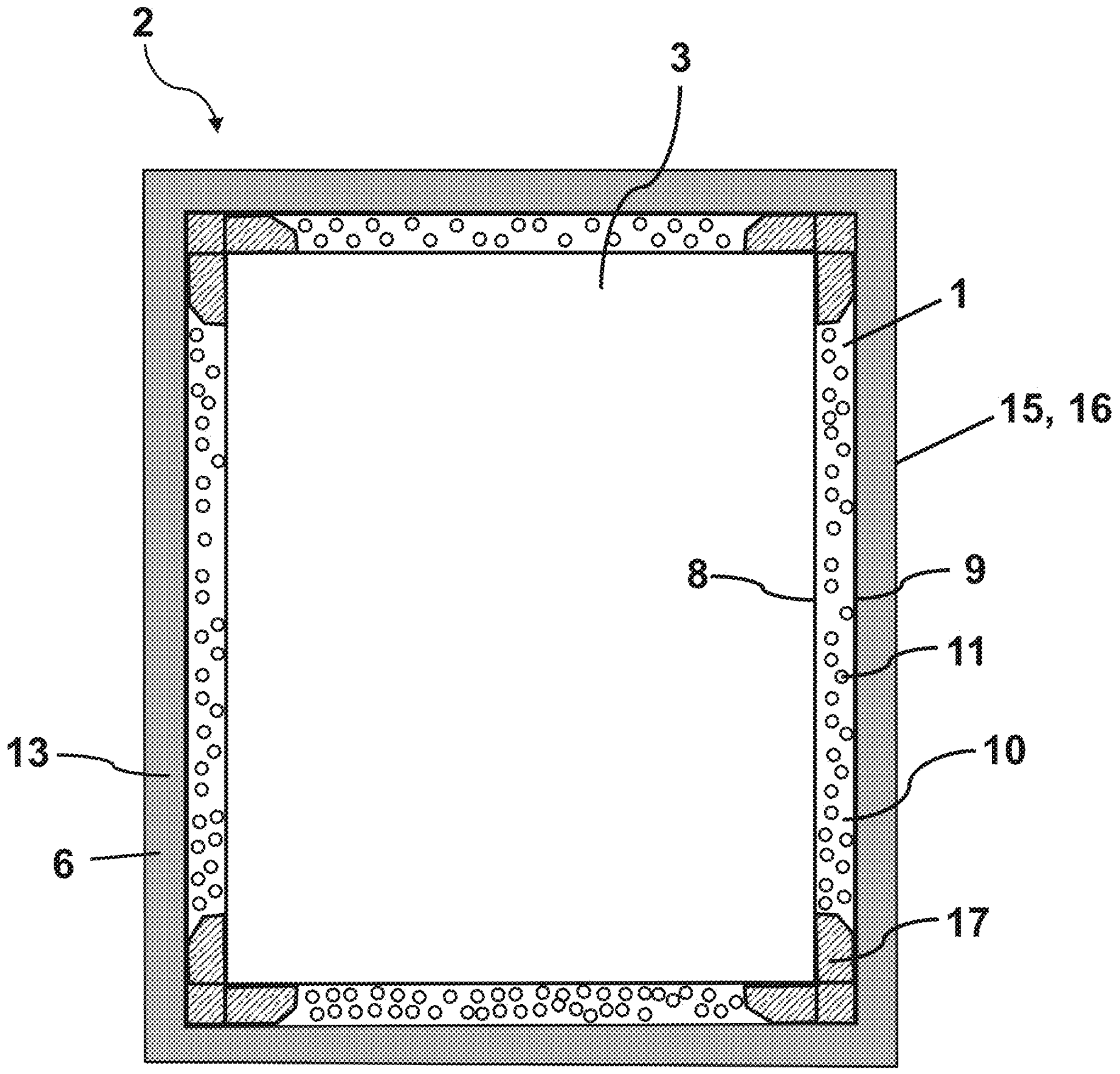

They depict:

FIG. 1 a schematic representation of the spacer according to the invention in cross-section, FIG. 2*a* a schematic representation of an insulating glazing with a spacer according to the invention in cross-section, FIG. 2*b* the insulating glazing of FIG. 2*a* in plan view.

FIG. 1 depicts a schematic representation of the spacer 1 according to the invention comprising a polymeric main body 5 with two pane contact surfaces 7.1 and 7.2, a glazing interior surface 8, an outer surface 9, and a hollow chamber 10. The outer surface 9 has an angled shape, wherein the angled sections 9*a*, 9*b* of the outer surface adjacent the pane contact surfaces 7.1 and 7.2 are inclined at an angle of $\alpha=45°$ relative to the pane contact surfaces 7.1 and 7.2.

This improves the stability of the main body 5. The angle between the pane contact surfaces 7.1, 7.2 and the glazing interior surface 8 is in each case $\beta=90°$. A water- and vapor-tight barrier film (not shown) that reduces the heat transfer through the polymeric main body 5 into the glazing interior of an insulating glazing is applied on the outer surface 9, the angled sections of the outer surface 9*a*, 9*b*, and, optionally, sub-regions of the pane contact surfaces 7.1, 7.2 of the spacer 1. A water- and vapor-tight barrier film (not shown) that reduces the heat transfer through the polymeric main body 5 into the glazing interior of an insulating glazing is applied on the outer surface 9 of the spacer 1. The barrier film has three polymeric layers of polyethylene terephthalate with a thickness of 12 μm and three metallic layers of aluminum with a thickness of 50 nm. The metallic layers and the polymeric layers are in each case applied alternatingly, with the layer of the barrier film facing the outer interpane space of the insulating glazing in the installed state of the spacer being a metallic layer. The barrier film is bonded to the main body 5. The hollow chamber 10 is suitable for being filled with a desiccant. The glazing interior surface 8 of the spacer 1 has openings 12, which are made at regular intervals circumferentially within a perforation groove 14 along the glazing interior surface 8 to enable a gas exchange between the interior of the insulating glazing and the hollow chamber 10. Thus, any humidity present in the interior is absorbed by the desiccant 11. The openings 12 are preferably implemented as slits with a width of 0.2 mm and a length of 2 mm. The material thickness (thickness) of the walls of the main body 5 is roughly the same circumferentially and is, for example, 1 mm. The main body has, for example, a height of 6.85 mm and a width of 15.30 mm. The pane contact surfaces 7.1, 7.2 have a height of 4.313 mm and thus accommodate 63% of the overall height of the spacer 1.

The mixture from which the main body 5 of FIG. 1 was extruded comprises styrene acrylonitrile as a thermoplastic base material at a proportion of 30 wt.-% to 35 wt.-% glass fibers, 1.0 wt.-% of a foaming agent, and color pigments. The main body 5 has pores in a size of 30 μm to 70 μm. The main body 5 had good mechanical strength, reduced thermal conductivity, and reduced weight.

The invention is explained in the following with reference to an Example according to the invention and a Comparative Example not according to the invention. A spacer according to FIG. 1 is used as the Example according to the invention. Used as a Comparative Example not according to the invention is a spacer that corresponds in its basic structure to the spacer of FIG. 1, includes styrene acrylonitrile as the thermoplastic base material with a proportion of 30 wt.-% to 35 wt.-% glass fibers and color pigments; however, in contrast to the Example according to the invention, it is not foamed. The spacer of the Comparative Example is produced with geometry similar to that of the spacer according to the invention, with Table 1 showing the geometry of the spacer according to the invention as the Example and the spacer not according to the invention as the Comparative Example compared to one another. The dimensions, the angles α and β, and the radii $R_1$, $R_2$, and $R_3$ with which the corners 18 inside the hollow chamber are rounded, or the radius $R_4$, with which the perforation groove is introduced, correspond to those depicted in FIG. 1.

TABLE 1

| | Example | Comparative Example |
|---|---|---|
| Height [mm] | 6.85 | 6.50 |
| Height Pane Contact Surfaces [mm] | 4.313 | 3.465 |
| Width [mm] | 15.30 | 15.50 |
| α [°] | 135 | 135 |
| β [°] | 90 | 90 |
| $R_1$ [mm] | 2.00 | 0.50 |
| $R_2$ [mm] | 2.00 | 0.50 |
| $R_3$ [mm] | 1.60 | 0.40 |
| $R_4$ [mm] | 0.36 | 0.30 |
| Depth Perforation Groove [mm] | 0.10 | 0.30 |

The spacers according to Example and Comparative Example were subjected to a lateral pressure test, wherein the test jaws of a press rest against the opposing pane contact surfaces 7.1, 7.2 and the spacer is compressed. In the region of the radii $R_1$ and $R_3$, the stresses occurring at the corners inside the hollow chamber were reduced by approx. 27%. At the perforation groove 14, the mechanical load was reduced by 47%. In addition, in a lateral pressure test of the spacer according to the invention per Example, even higher maximum forces are reached before fracture occurs. The non-foamed spacer per Comparative Example reached maximum forces of >1850 N. When this spacer of the Comparative Example is implemented as a foamed spacer, only >1500 N is reached. By comparison, the spacer according to the invention of the Example as a foamed spacer withstands forces of >2500 N before fracture occurs. At the same time, a weight saving of approx. 14% is achieved by means is of the spacer of the Example according to the invention. Furthermore, the spacer geometry of the Example according to the invention enables the introduction of 2.2% more desiccant in der hollow chamber 10 of the spacer of FIG. 1.

FIGS. 2*a* and 2*b* depict an insulating glazing 2 with the spacer 1 according to the invention of FIG. 1, wherein the gas- and vapor-tight barrier film is not shown in detail. FIG. 2*a* depicts a cross-section of the insulating glazing 2, while FIG. 2*b* is a plan view. FIG. 2*b* depicts an overall view of the insulating glazing 2 of FIG. 2*a*. The spacers 1 are connected to one another at the corners of the insulating glazing 2 by corner connectors 17. The spacer 1 according to the invention is attached circumferentially between a first pane 15 and a second pane 16 via a sealant 4. The sealant 4 connects the pane contact surfaces 7.1 and 7.2 of the spacer 1 to the panes 15 and 16. The hollow chamber 10 is filled with a desiccant 11. Molecular sieve is used as the desiccant 11. The glazing interior 3 adjacent the glazing interior surface 8 of the spacer 1 is defined as the space delimited by the panes 15, 16 and the spacer 1. The outer interpane space 13 adjacent the outer surface 9 of the spacer 1 is a strip-shaped circumferential section of the glazing, which is delimited by one side each of the two panes 15, 16 and on another side by the spacer 1, and its fourth edge is open. The glazing interior 3 is filled with argon. A sealant 4 that seals the gap between pane 15, 16 and spacer 1 is introduced in each case between one pane contact surface 7.1 or 7.2 and the adjacent pane 15 or 16. The sealant 4 is polyisobutylene. In the outer interpane space 13, an outer seal 6 that serves to bond the first pane 19 and the second pane 20 is applied on the outer surface 9. The outer seal 6 is made of polysulfide. The outer seal 6 ends flush with the pane edges of the first pane 15 and the second pane 16.

LIST OF REFERENCE CHARACTERS

1 spacer
2 insulating glazing
3 glazing interior
4 sealant
5 polymeric main body
6 outer seal
7 pane contact surfaces
7.1 first pane contact surface
7.2 second pane contact surface
8 glazing interior surface
9 outer surface
10 hollow chamber
11 desiccant
12 openings
13 outer interpane space
14 perforation groove
15 first pane
16 second pane
17 corner connector
18 corners inside the hollow chamber

The invention claimed is:

1. A spacer for insulating glazings comprising a polymeric main body at least comprising a first pane contact surface, a second pane contact surface, a glazing interior surface, an outer surface, and a hollow chamber, wherein the first pane contact surface and the second pane contact surface run opposite one another and parallel to one another, the glazing interior surface and the outer surface are connected to one another via the first pane contact surface and the second pane contact surface, the hollow chamber is enclosed by the glazing interior surface, the outer surface, the first pane contact surface, and the second pane contact surface, the outer surface has a first angled section adjacent the first pane contact surface and a second angled section adjacent the second pane contact surface, the first angled section and the second angled section assume in each case an angle α of 120° to 150° relative to the respective adjacent first pane contact surface and second pane contact surface, and the polymeric main body has at least one corner inside the hollow chamber within a cross-section perpendicular to a longitudinal direction of the polymeric main body and in a region of at least one of the first and second angled sections and the respective first or second pane contact surface adjacent thereto, which corner is rounded with a radius $R_1$ of 0.4 mm to 2.5 mm, the polymeric main body has, within said cross-section in the region of the first angled section and the region of the second angled section, at least one corner inside the hollow chamber with the outer surface, which corner is rounded with a radius $R_2$ of 0.4 mm to 2.5 mm, the glazing interior surface assumes in each case an angle β of 87° to 93° with the first pane contact surface and the second pane contact surface, and the polymeric main body has, within said cross-section, a corner inside the hollow chamber in a region of the glazing interior surface and the first pane contact surface and/or the second pane contact surface, which corner is rounded with a radius $R_3$ of 1.0 mm to 2.5 mm.

2. The spacer according to claim 1, wherein the first angled section and the second angled section assume an angle α of 130° to 140° in each case relative to the respective adjacent first pane contact surface and second pane contact surface.

3. The spacer according to claim 1, wherein each corner inside the hollow chamber of an angled section with the adjacent pane contact surface is rounded with the radius $R_1$ of 0.4 mm to 2.5 mm.

4. The spacer according to claim 1, wherein the first angled section and the second angled section have in each case a corner inside the hollow chamber with the outer surface, which is rounded with the radius $R_2$ of 0.4 mm to 2.5 mm.

5. The spacer according to claim 1, wherein the glazing interior surface assumes an angle β of 89.5° to 90.5° in each case with the first pane contact surface and the second pane contact surface and the corners inside the hollow chamber of the glazing interior surface with the first pane contact surface and the glazing interior surface with the second pane contact surface are rounded with the radius $R_3$ of 1.0 mm to 2.0 mm.

6. The spacer according to claim 1, wherein the polymeric main body has, between the first and second pane contact surfaces and the first and second angled sections as well as between the first and second angled sections and the outer surface, outside corners that are rounded with a radius $R_5$ of 0.125 mm to 0.7 mm.

7. The spacer according to claim 1, wherein a height of the first and second pane contact surfaces is between 55% and 80% of an overall height of the spacer.

8. The spacer according to claim 1, wherein a wall thickness of the polymeric main body is between 0.5 mm and 1.5 mm.

9. The spacer according to claim 1, wherein a perforation groove that has multiple openings in the glazing interior surface runs substantially parallel to the first and second pane contact surfaces in the glazing interior surface.

10. The spacer according to claim 1, wherein the polymeric main body includes a thermoplastic polymer as base material.

11. The spacer according to claim 1, wherein the polymeric main body has a foamed pore structure.

12. The spacer according to claim 11, wherein the polymeric main body is foamed by a foaming agent comprising a blowing agent and a carrier material.

13. The spacer according to claim 11, wherein the polymeric main body contains a thermoplastic polymer as base material at a proportion of 30.0 wt.-% to 70.0 wt.-%, as an elastomeric additive, a thermoplastic elastomer, and/or a thermoplastic terpolymer having an elastomeric component at a proportion of 0.5 wt.-% to 20.0 wt.-% in total, and a reinforcing agent at a proportion of 20.0 wt.-% to 45.0 wt.-%.

14. The spacer according to claim 1, wherein a gas- and water-tight barrier film is applied at least on the outer surface and the first and second angled sections of the polymeric main body.

15. An insulated glazing comprising a spacer according to claim 1, a first pane and a second pane, wherein the first pane is attached to the first pane contact surface of the spacer via a sealant and the second pane is attached to the second pane contact surface of the spacer via a sealant.

16. The spacer according to claim 3, wherein the radius $R_1$ is from 0.8 mm to 2.5 mm.

17. The spacer according to claim 4, wherein the radius $R_2$ is from 0.8 mm to 2.5 mm.

18. The spacer according to claim 5, wherein the radius $R_3$ is from 1.3 mm to 1.7 mm.

19. The spacer according to claim 6, wherein the radius $R_5$ is from 0.3 mm to 0.7 mm.

20. The spacer according to claim 7, wherein the height of the first and second pane contact surfaces is between 60% and 75% of the overall height of the spacer.

21. The spacer according to claim 1, wherein radius R1 is from 1.5 mm to 2.5 mm and radius R2 is from 1.5 mm to 2.5 mm.

* * * * *